(12) United States Patent
Rackow

(10) Patent No.: US 6,323,410 B1
(45) Date of Patent: Nov. 27, 2001

(54) SLIDE RULE MUSICAL SCALE TEACHING DEVICE

(76) Inventor: Daniel P. Rackow, 10 Annette Ave., Edgewater, NJ (US) 07020

( * ) Notice: Subject to any disclaimer, the term of this patent is extended or adjusted under 35 U.S.C. 154(b) by 0 days.

(21) Appl. No.: 09/621,040

(22) Filed: Jul. 21, 2000

(51) Int. Cl.$^7$ .................................................. G09B 15/00
(52) U.S. Cl. .......................................... 84/470 R; 84/4 B
(58) Field of Search ............................. 84/470 R, 471 R, 84/473, 471 SR (56) References Cited

U.S. PATENT DOCUMENTS

| | | |
|---|---|---|
| 2,832,252 | 4/1958 | Gabriel . |
| 3,592,099 | 7/1971 | Gibby . |
| 3,791,254 | 2/1974 | Muller . |
| 4,444,083 * | 4/1984 | Apel et al. ......................... 84/423 R |
| 4,602,550 * | 7/1986 | Dadi et al. ............................. 84/473 |
| 4,677,893 * | 7/1987 | Fahnestock ....................... 84/471 SR |
| 4,960,029 | 10/1990 | Nelson . |
| 5,029,507 | 7/1991 | Bezeau, Jr. . |
| 5,410,940 * | 5/1995 | Havas ..................................... 84/473 |
| 5,415,071 * | 5/1995 | Davies ............................. 84/471 SR |
| 5,524,522 | 6/1996 | Hesnan . |
| 5,644,096 | 7/1997 | Bull . |

* cited by examiner

Primary Examiner—Robert E. Nappi
Assistant Examiner—Kim Lockett
(74) Attorney, Agent, or Firm—Philip Furgang Furgang & Adwar, LLP (57) ABSTRACT

The musical slide rule has a base listing two sets of musical note symbols, each set arranged in two columns. The base is imprinted on both sides. The cover has apertures in each side and is slidable on the base. One side is the flat (♭) side, and the opposite side is the sharp (♯) side. There are also ways that the user will know that the wrong side is being used. Aligning the apertures of the cover with a musical note symbol on the base gives the user information such as the notes of the major and minor scale for that note, and chords for that note.

19 Claims, 12 Drawing Sheets

Q #7 - What are the notes of a C, major chord?
Q #8 - What are the notes of a D, major chord?
Q #9 - What are the notes of an E major 7th chord?
Q #10 - What are the notes of an E 7th chord?
Q #11 - What are the notes of an A minor chord?
Q #12 - (Advanced) - What are the notes in the key of C#?
Q #13 - (Advanced) - What are the notes of an Bb augmented, (+5) chord?
Q #14 - (Advanced) - What are the notes of an B augmented, (+5) chord?
Q #15 - (Advanced) - What are the notes of an Eb diminished 7th chord?

A #7
A #8
A #9
A #10
A #11
A #12 — Key of A minor is the Relative minor to the key of C.
A #13 — When you see two of the same letters in this scale, (F,F# or C,C#), use the "white sharpe" in the same chord.
A #14
A #15 — This chord has flats and sharps in the same chord. "Fx" stands for "F double sharp." (Same tone as G) "Bbb, Dbb" stands for "B, D double flat." (Same tones as A/C)

— Major chords use the 1st, 3rd & 5th tones of the key.
— Use ⊙ or ⊚ to build more complex chords.

FIG.2'

(SEE FIG.2)

SLIDE RULE MUSICAL SCALE TEACHING DEVICE

BACKGROUND OF THE INVENTION

1. Field of the Invention

The present invention relates to devices for teaching the various musical scales. The invention comprises a slide rule having a base and a cover with apertures, the cover sliding over the base to reveal musical notes in the apertures.

2. Description of the Prior Art

Any student learning a musical instrument or studying music generally, must learn scales, chords and notes. These are the basis of the music theory upon which songs are arranged. A scale is a sequential series of tones, chords or notes. A scale covers an octave. The scale repeats for every octave. Tones are designated by the letters A, B, C, D, E, F and G. When each note repeats, an octave is complete. Each note represents a different sound frequency. The sound frequency difference between tones is given in steps, but the steps between each tone of A–G is not the same. There is a half step interval between B and C and between E and F, while there are whole step intervals between each of the other tones.

Each tone may be raised or lowered a one-half step. If a tone is raised or lowered, it is referred to as the accidental of the tone. When raised a half tone, it is known as a sharp and denoted by the "♯" sign. When a tone is lowered a half step, it is represented by a "♭" sign. The natural tones are denoted by the letters A–G and correspond to the white piano keys and the accidentals F♯, G♯, A♯, C♯ and D♯, or G♭, A♭, B♭, D♭ and E♭, correspond to the black piano keys.

Any major scale is based on the succession of the eight tones and constitutes steps of whole, whole, half, whole, whole, whole and half. When the first tone is a C, the scale is known as a C major scale. Major scales can be constructed to begin with any of the tones, in order to be a major scale, the steps between the third and fourth tone and the seventh and eight tone are half steps. This is accomplished by using accidentals when necessary. As an example, the G major scale would be constructed to be G, A, B, C, D, E, F♯, G.

There are also minor scales. They are a succession of eight tones, but the steps between notes are whole, half, whole, whole, half, whole and whole. Like the major scale, minor scales can be constructed to begin with any tones using appropriate accidentals of the tones to maintain the proper step progression.

There are two major main variants of the minor scale, the harmonic minor scale and the melodic minor scale. The harmonic minor scale raises a seventh step to be a half step difference between the seventh and eighth step of the octave, whereas the melodic minor scale raises the sixth step when the melody is ascending, but the sixth and seventh are retort and natural when the melody is descending.

A contrast to the concept of a scale which is the sequence of individual notes, a chord is a simultaneous playing of more than one note. The major chord for any scale is the first, third and fifth note of that scale, played simultaneously.

Because scales, chords and progressions are the basis of music theory, students of music need to learn their intricacies. There is, therefore, a need for a device to help students visually learn the various components of music.

The prior art is replete with patents that have attempted to satisfy such need, but with limited success, at best.

To illustrate, U.S. Pat. No. 4,960,029 (Nelson) discloses a musical scale determining device having a slide rule configuration. A cursor 26 is moved along a body 17 to disclose a variety of music scales.

U.S. Pat. No. 4,677,893 (Fahnestock) discloses a musical note slide rule to display the musical note letter composition of scales for each of the 15 major keys and 15 minor keys. The slide rule also displays 16 sets of chords for each of the 15 chord letters.

U.S. Pat. No. 3,592,099 (Gibby) discloses a slide rule that may be in linear or circular form. Interval, comparative, major and minor chords and multiple chord combinations are displayed.

U.S. Pat. No. 2,832,252 (Gabriel) discloses a musical slide rule having a base and slidable cover. The cover is moved along the base to reveal various scales.

U.S. Pat. No. 3,791,254 (Muller) discloses a musical teaching aid having two bar members arranged on a slide rule. The upper member has a column of windows to view the symbols on the lower member. When a window is set on a basic key note, various harmonics may be read from the other windows.

U.S. Pat. No. 5,644,096 (Bull) discloses a musical computation device having alphabetical representation of musical notes, a representation of a keyboard and a representation of the finger positions on an instrument. The apparatus can be used to determine scales and variations thereof.

U.S. Pat. No. 5,029,507 (Bezeau, Jr.) discloses a chord progression finder to determine each tone of a selected musical scale in a selected key note. Every tone of the relative musical scale, as well as various chords playable for the selected musical scale can be determined.

U.S. Pat. No. 5,524,522 (Hesnan) discloses a musical learning aid having a base and a sliding template provided with windows. The windows allow viewing of information printed on the base, the position of a window over a key note allows cut out slots of the template to show musical information before that key note scale and chord.

It is an object of the invention to provide a musical scale slide rule that is easy to use and inexpensive to manufacture.

It is another object of the invention to provide a musical scale rule that shows both major and minor scales simultaneously.

It is still another object of the invention to provide a musical slide rule that can be used to determine chords and including major chords, diminished chords or complex chords.

It is yet another object of the invention to provide a musical slide rule that has separate sides for the sharp (♯) and the flat (♭).

These and other objects of the invention will be come apparent after reading the full disclosure of the invention.

SUMMARY OF THE INVENTION

The musical slide rule has a base listing two sets of musical note symbols, each set arranged in two columns. The base is imprinted on both sides. The cover has apertures in each side and is slidable on the base. One side is the flat (♭) side, and the opposite side is the sharp (♯) side. There are also ways that the user will know that the wrong side is being used. Aligning the apertures of the cover with a musical note symbol on the base gives the user information such as the notes of the major and minor scale for that note, and chords for that note.

DETAILED DESCRIPTION OF THE INVENTION

Figure 1:
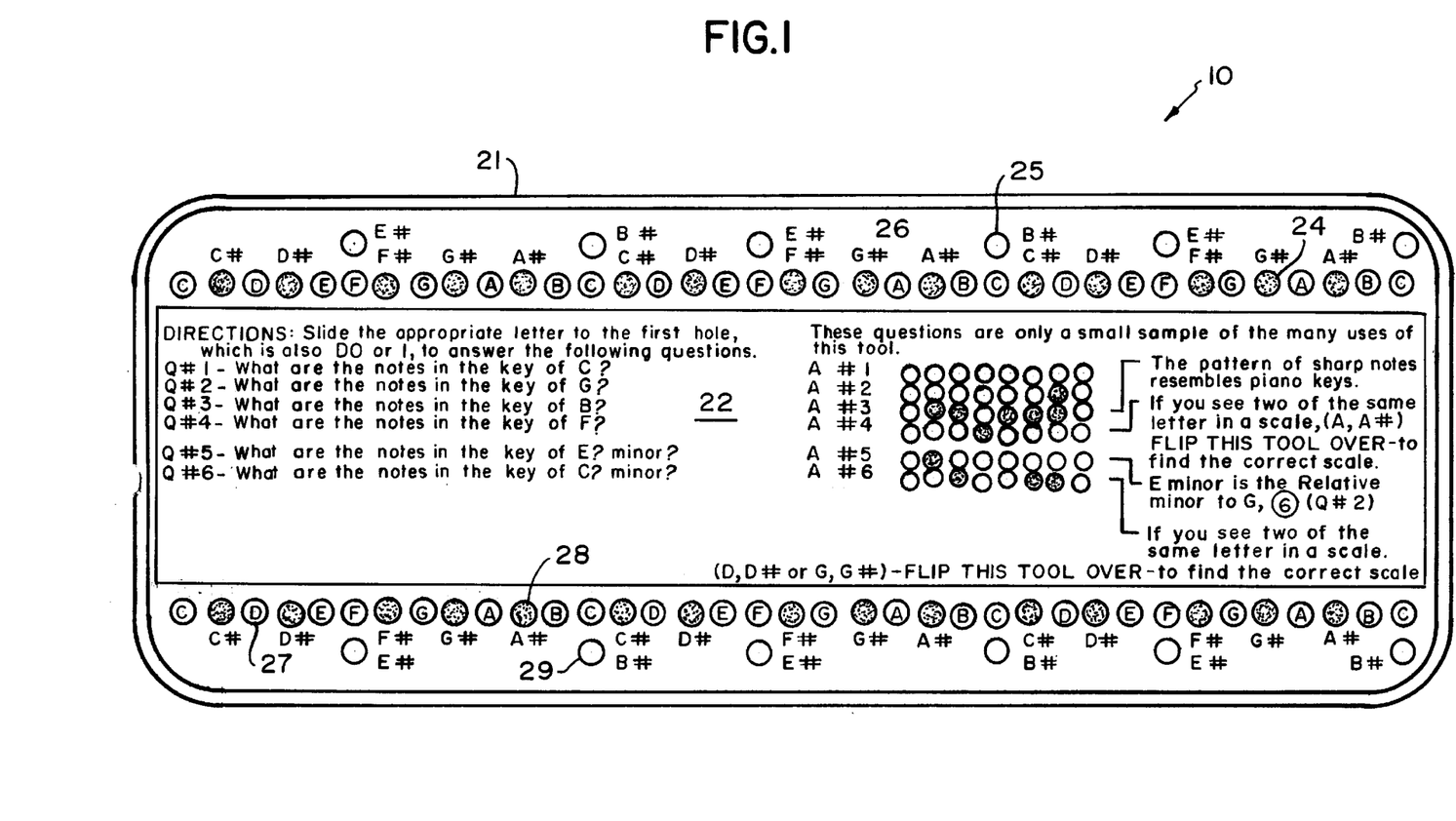
FIG. 1 shows a first side of the base of a slide rule constructed in accordance with the principles of the instant invention.

The slide rule musical scale teaching device has a base 10 and a cover 50. The base has first and second sides with symbols representing musical notes printed on them. The first side 21 of the base has a top set of musical notes 24 having an upper row 25 representing the white sharps (♯) and a lower row 26. (A "white sharp" refers to a white key which is listed as a sharp (♯) in the applicable scale.) The notes are written to represent whether the note represents a white key or black key of a piano. A bottom set 27 of musical notes has an upper row 28 and a lower row 29. The lower row 29 represents the white sharps (♯), much in the same way as the upper row 25.

Figure 2:
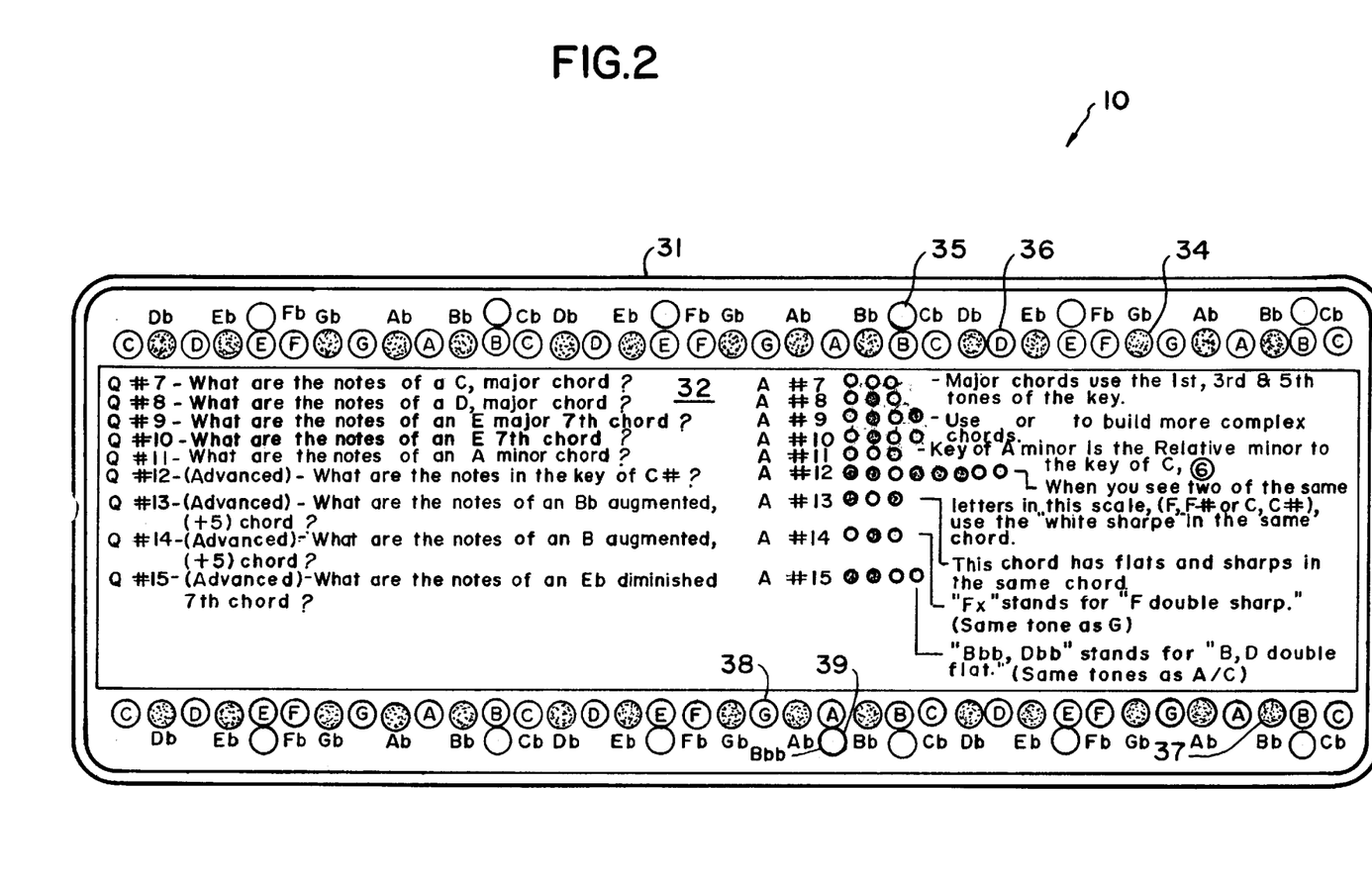
FIG. 2 shows the second side of the base of the slide rule.

The second side 31 of the base also has two sets of symbols representing musical notes. The top row 34 has an upper row 35 and a lower row 36. The upper row 35 represents white flats (♭). The bottom set 37 has upper row 38 and lower row 39. Like the upper row 35, the lower row 39 represents white flats (♭). On both the first side 21 and second side 31 the central portion between the top and bottom sets provides a place for indicia. This indicia is most advantageously used to pose questions to the user of the device. When the user is able to answer the questions in the central portions 22 and 32 of the first and second side, respectively, the user can slide to the answer to assure that they are using the device properly.

Figure 3:
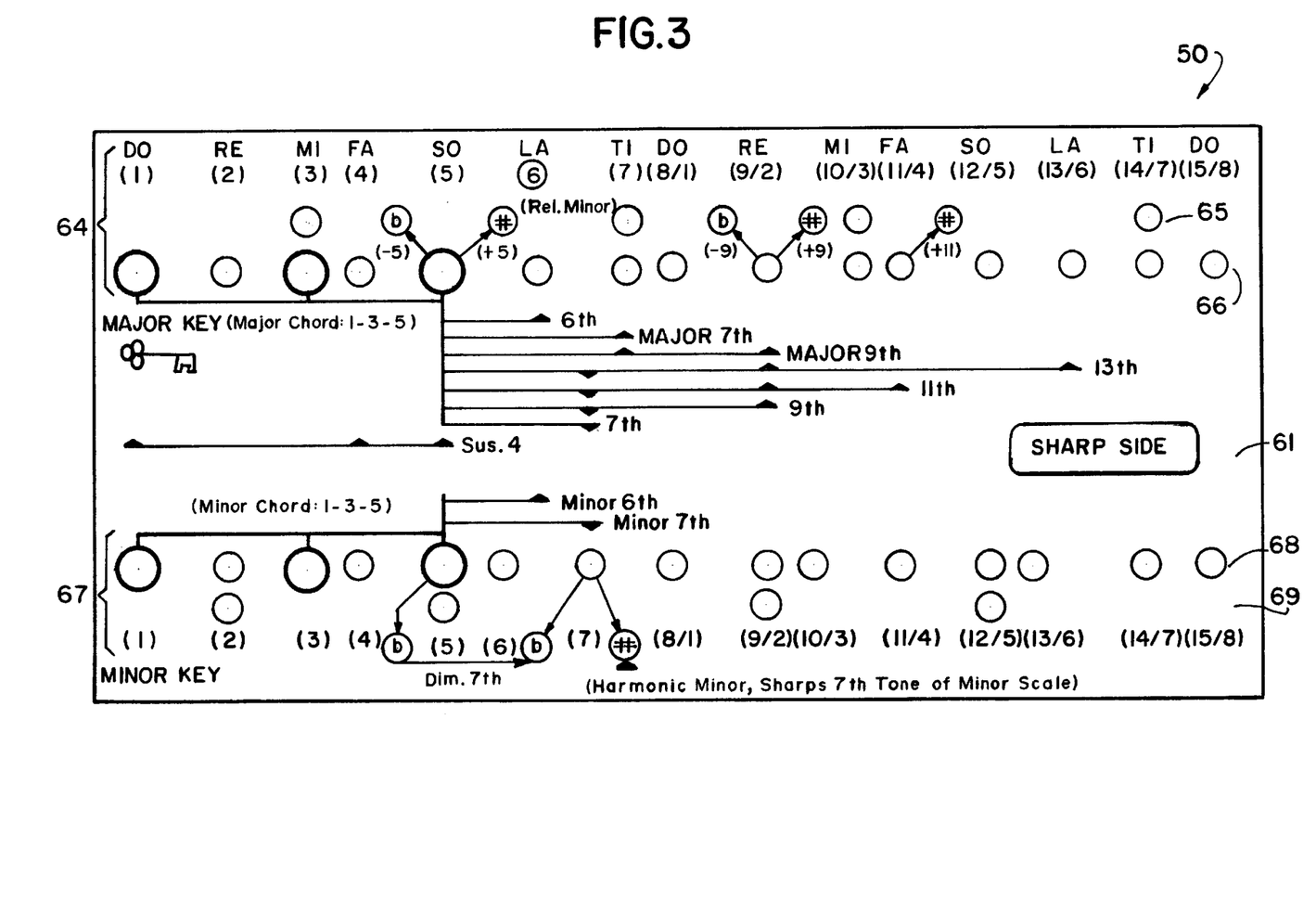
FIG. 3 shows the sharp (♯) side of the cover of the slide rule.
Figure 4:
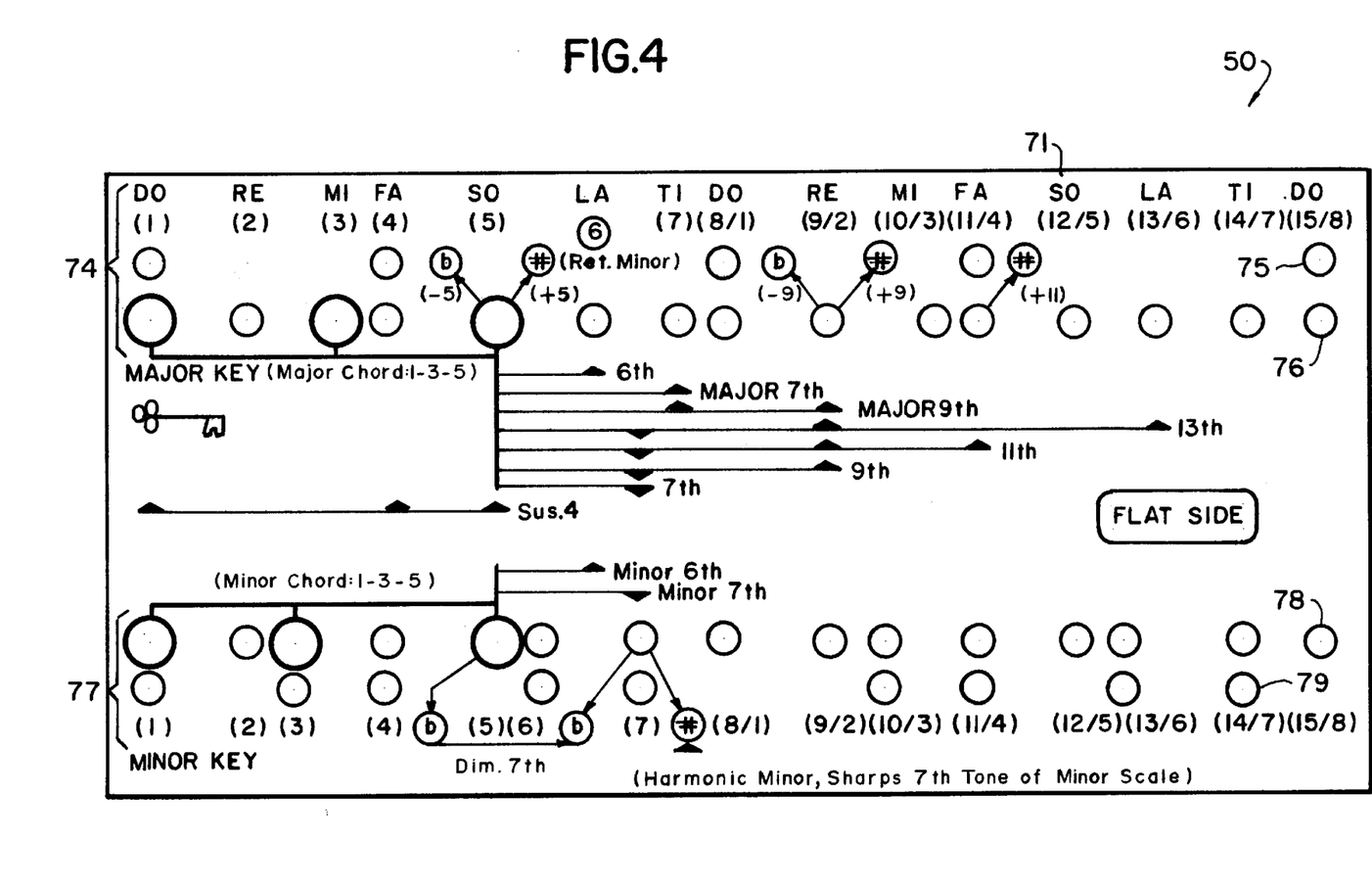
FIG. 4 shows the flat (♭) side of the cover of the slide rule.

The cover 50 is formed by a sharp (♯) side 61 and flat (♭) side 71 joined to one another at their top and bottom edges. The left and right side of the cover 50 is open to allow the cover 50 to slide along the base 10.

The sharp (♯) side 61 (FIG. 3) has a top set of apertures 64 made up of an upper row 65 and a lower row 66. The top set 64 corresponds to the major key. The upper row 65 shows the rare occurrence of a white sharp (♯) in a major scale. A bottom set of apertures 67 corresponds to the minor key. The bottom set 67 has an upper row 68 that represents the melodic minor key and a lower set of apertures 69 that shows the rare occurrence of a white sharp (♯) in a melodic minor key.

The flat (♭) side 71 corresponds to the sharp (♯) 61 in that it has a top set of apertures 74 corresponding to major key formed by an upper row of apertures 75 and a lower row of apertures 76. The minor key is represented by a bottom set of apertures 77 formed by the upper row of apertures representing the melodic minor and a lower row of apertures 79 representing the white flats (♭). (A "white flat" refers to a white key which is listed as a flat (♭) in the applicable scale.)

In addition to the apertures, the sharp (♯) side 61 and flat (♭) side 71 have indicia to assist the user. The first, third and fifth notes of the major key may be outlined in a contrasting color such as blue. These notes represent the major chord in that key. Similarly, the first, third and fifth notes of the minor key may be outlined in another contrasting color, such as red, to represent the minor chord in that key. A set of arrows, in the form of triangles, may be printed on the side. These arrows allow the user to build more complex chords.

The relative minor is indicated in a red circle around the sixth note. There are also green arrows leading to sharp (♯) and flat (♭) symbols spaced at the fifth, ninth and eleventh note of the major key and fifth and seventh notes of the minor key. These arrows are used to calculate diminished and augmented chords.

Figure 5:
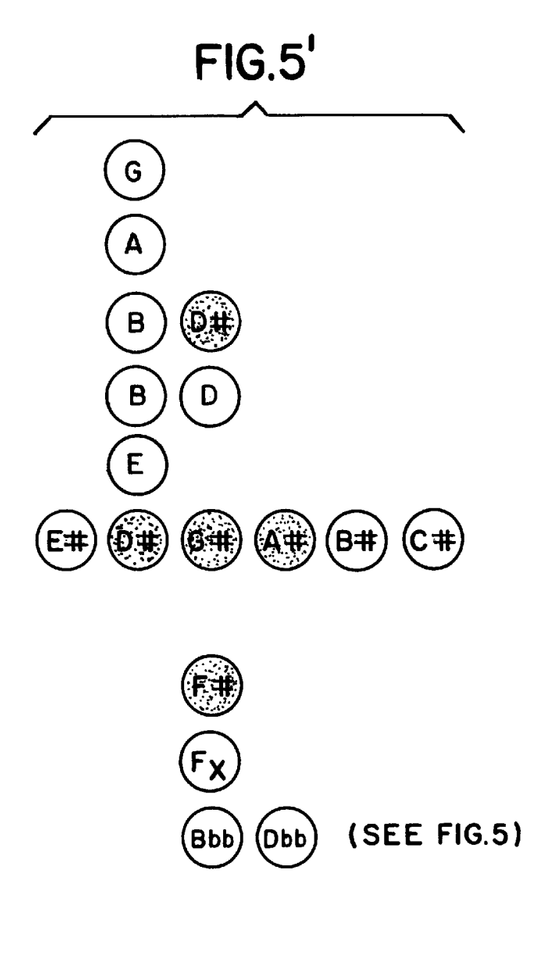
FIG. 5 shows the base and cover in use together.

By aligning the left most aperture of either the sharp (♯) side or the flat (♭) side with any note on the base 10, the apertures display the note for that scale. This is shown in FIG. 5. In the depiction of FIG. 5, the left-most aperture of the major key has been aligned with the C note depicted on the base. As can be seen, the major key, major chord, minor keys and minor chord are all displayed simultaneously. The notes that would correspond to the black keys on a piano are solid colored with the note depicted in white. The sharp (♯) and flat (♭) scales are separated and the user can find the correct scale by simply flipping the tool over to the other side. The slide rule displays a relationship of white sharps (♯), for example, E♯ equals an F and a B♯ equals a C and the relationship of white flats (♭), for example, the C♭ is a B and an F♭ is an E. The slide rules also displays chords having both sharps (♯) and flats (♭) in the same card, chords that have double sharps (♯) or double flats (♭). Also, at a single glance, the user can see the relationship of the relative minor to the major key.

When using the sharp (♯) side, finding two of the same letter in a scale, such as an A and an A♯, signals the user to flip the tool over to find the correct scale. When two of the same letter in a scale are encountered, the user is given examples of how to use the white sharps (♯) or flats (♭) in the upper or lower rows of apertures. By sliding the cover along the base, the user is able to determine a variety of information at the same time. Once the left-most aperture is aligned with a note in the base, the major key, and minor keys, are displayed. Also, the use of indicia allows the user to quickly ascertain the major chord and minor chord in that key. Other indicia allows the user to build more complex chords and calculate augmented and diminished chords. This simple, easy to use tool, provides a wealth of information for the user.

Figure 3A:
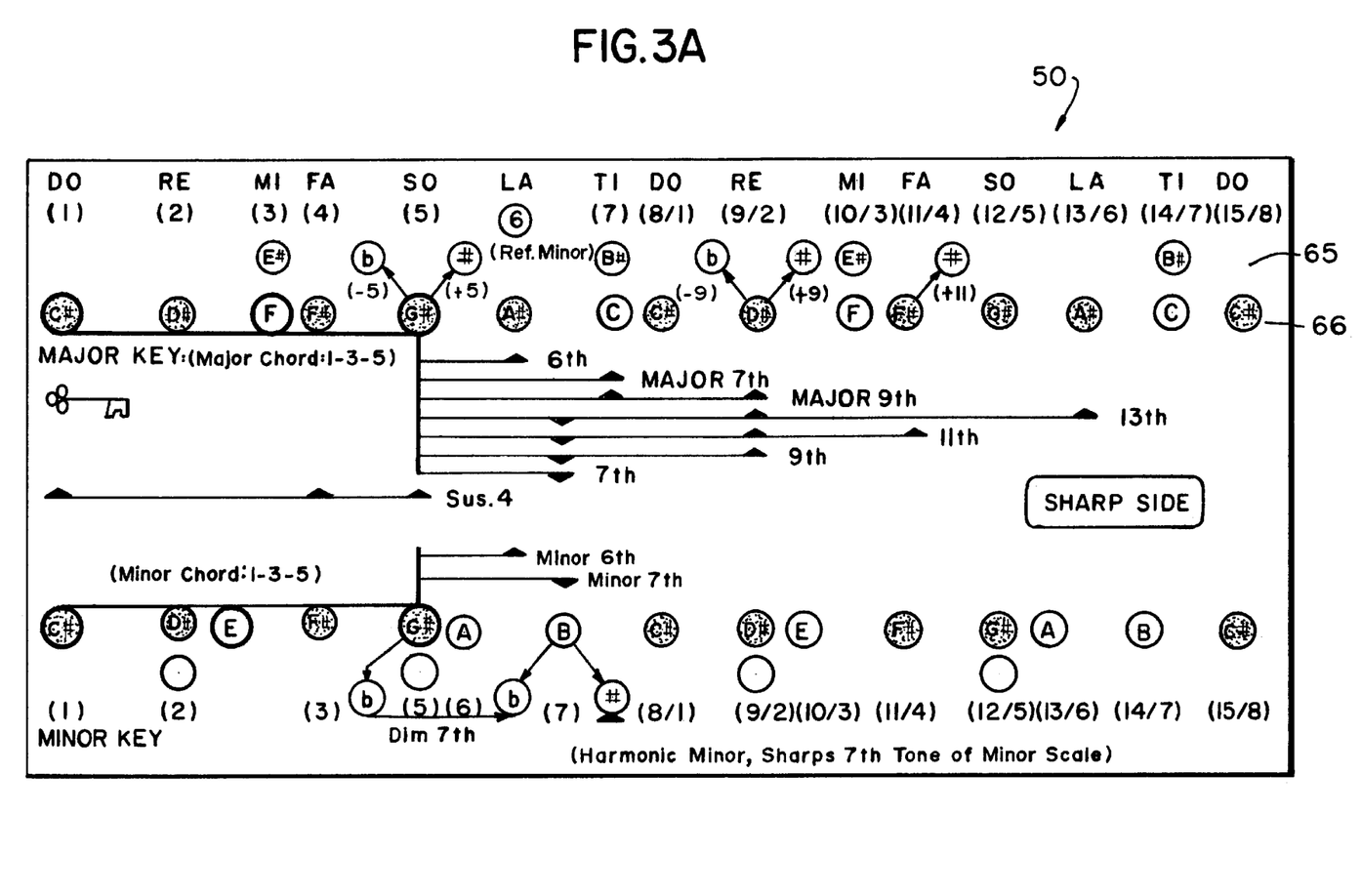
FIG. 3A shows the sharp (♯) side of the slide rule with a specific display and is paired with FIG. 4A which shows the flat (♭) side of the slide rule with the specific display.
Figure 4A:
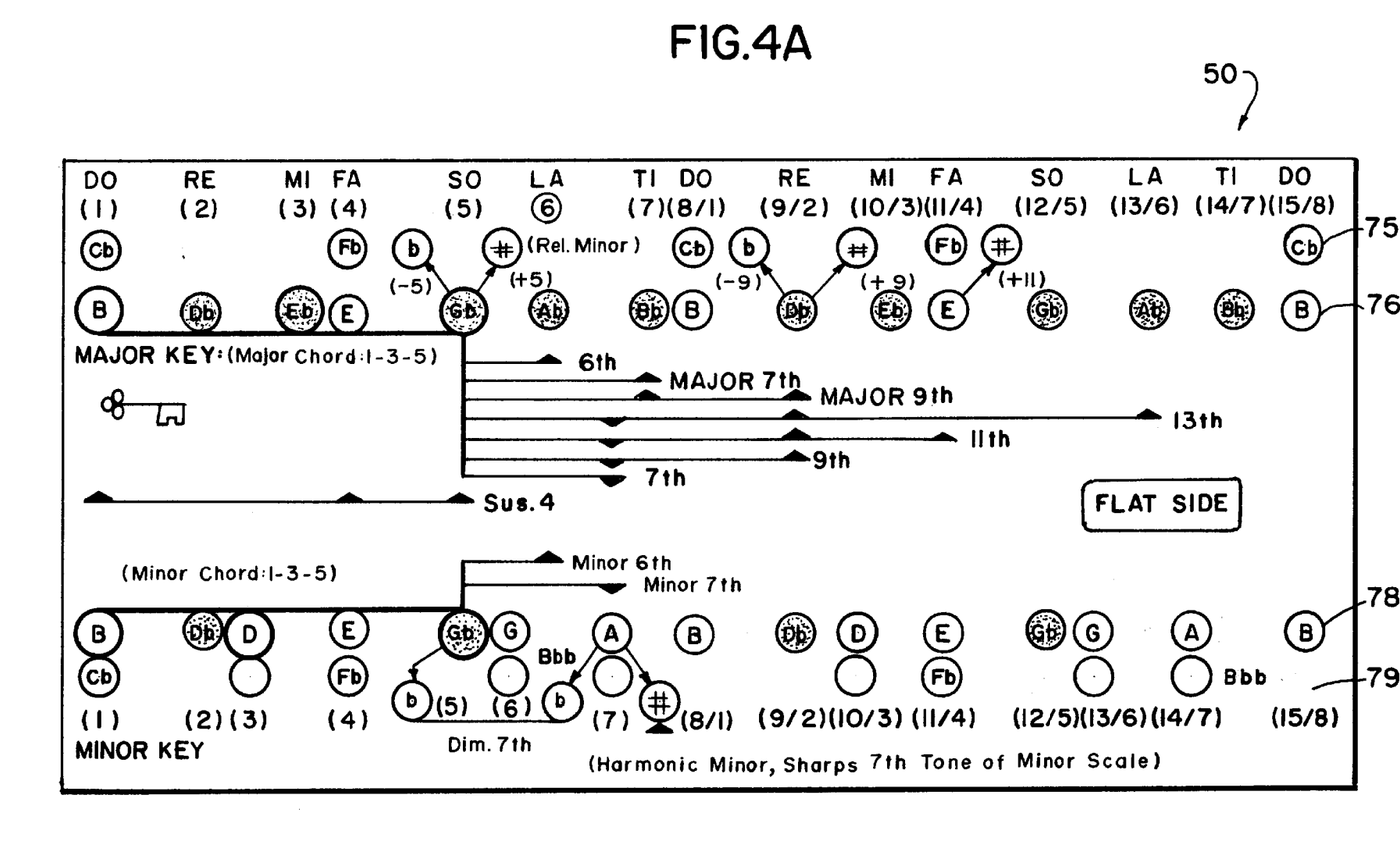
Figure 4B:
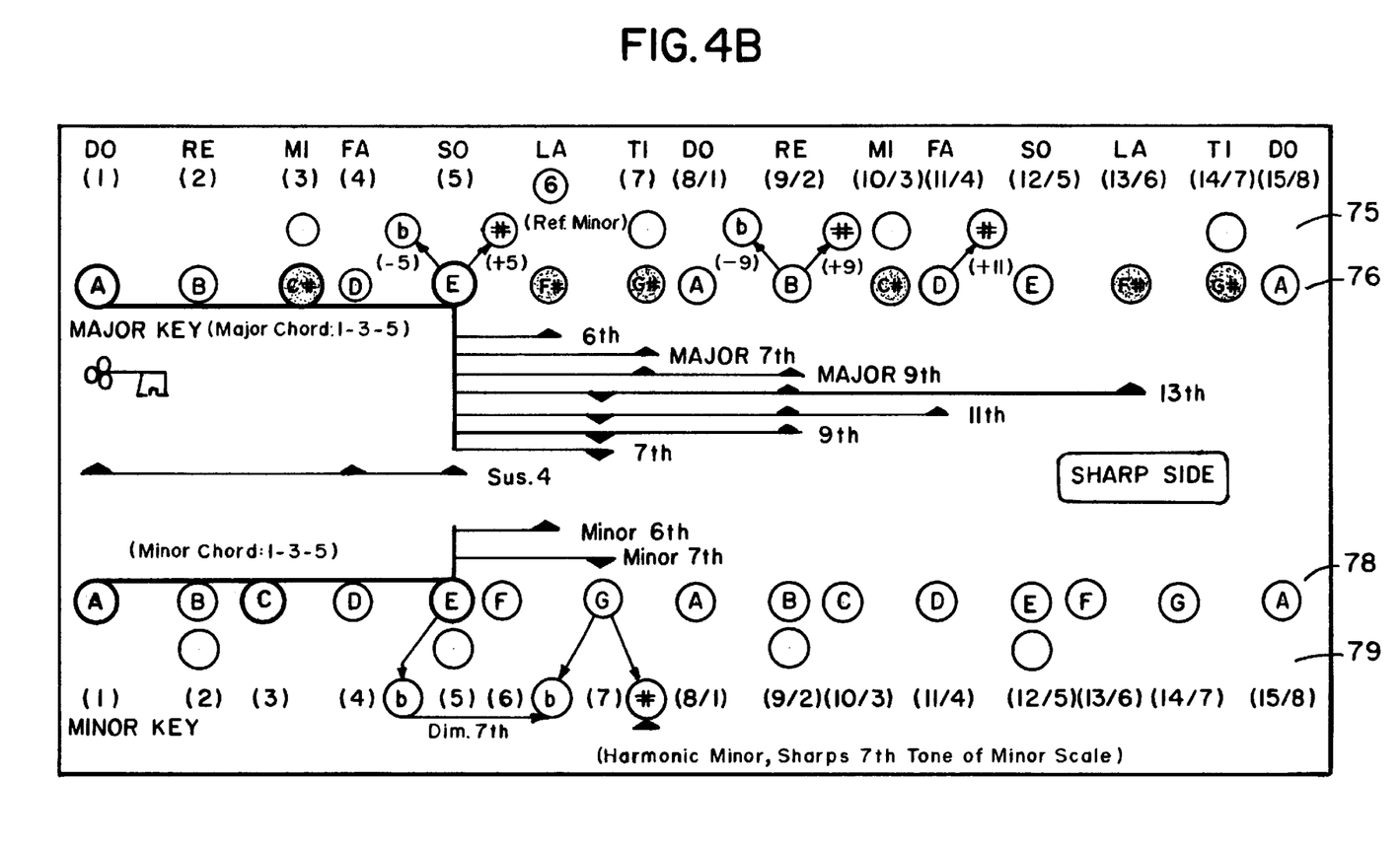

In FIG. 3A white sharps are shown (see F (row 66) and E♯ (row 65) in at (3) and C (row 66) and B♯ (row 65) at (7)). On the other or flat side FIG. 4A shows the display of white flats in row 75 while row 79 with its descriptors below shows the formation of a complex chord, in this case C♭, F♭, B♭♭.

Figure 3B:
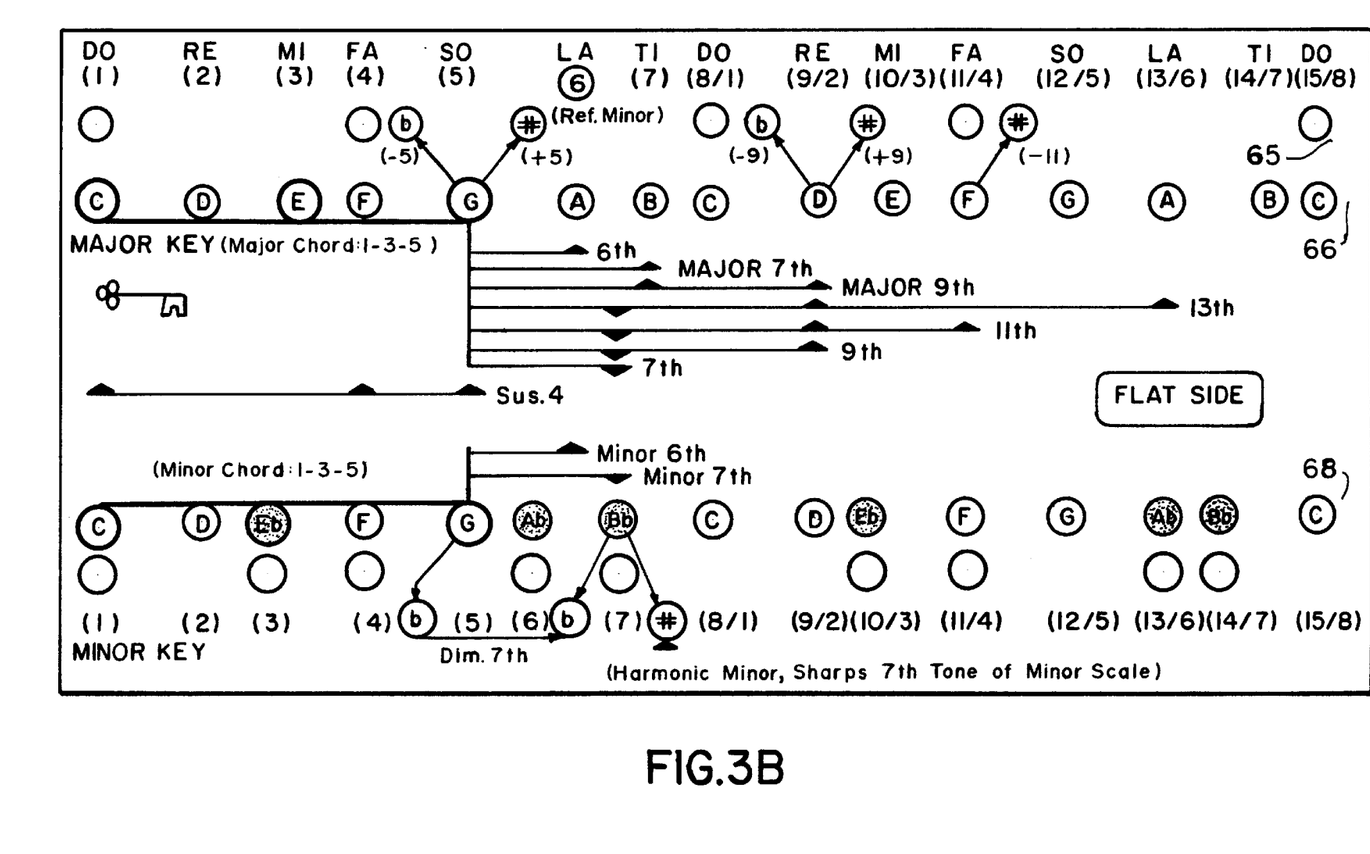
FIG. 3B shows the flat (♭) side of the slide rule with a specific display and is paired with FIG. 4B which shows the sharp (♯) side of the slide rule with the specific display.

In FIG. 3B the flat side displays a major scale (row 66. Notice also the display of C major in row 66 and how, on the sharp side it is displayed in row 78 as part of the minor scale. Finally, row 68 of the flat side FIG. 3B displays the minor scale.

Figure 3C:
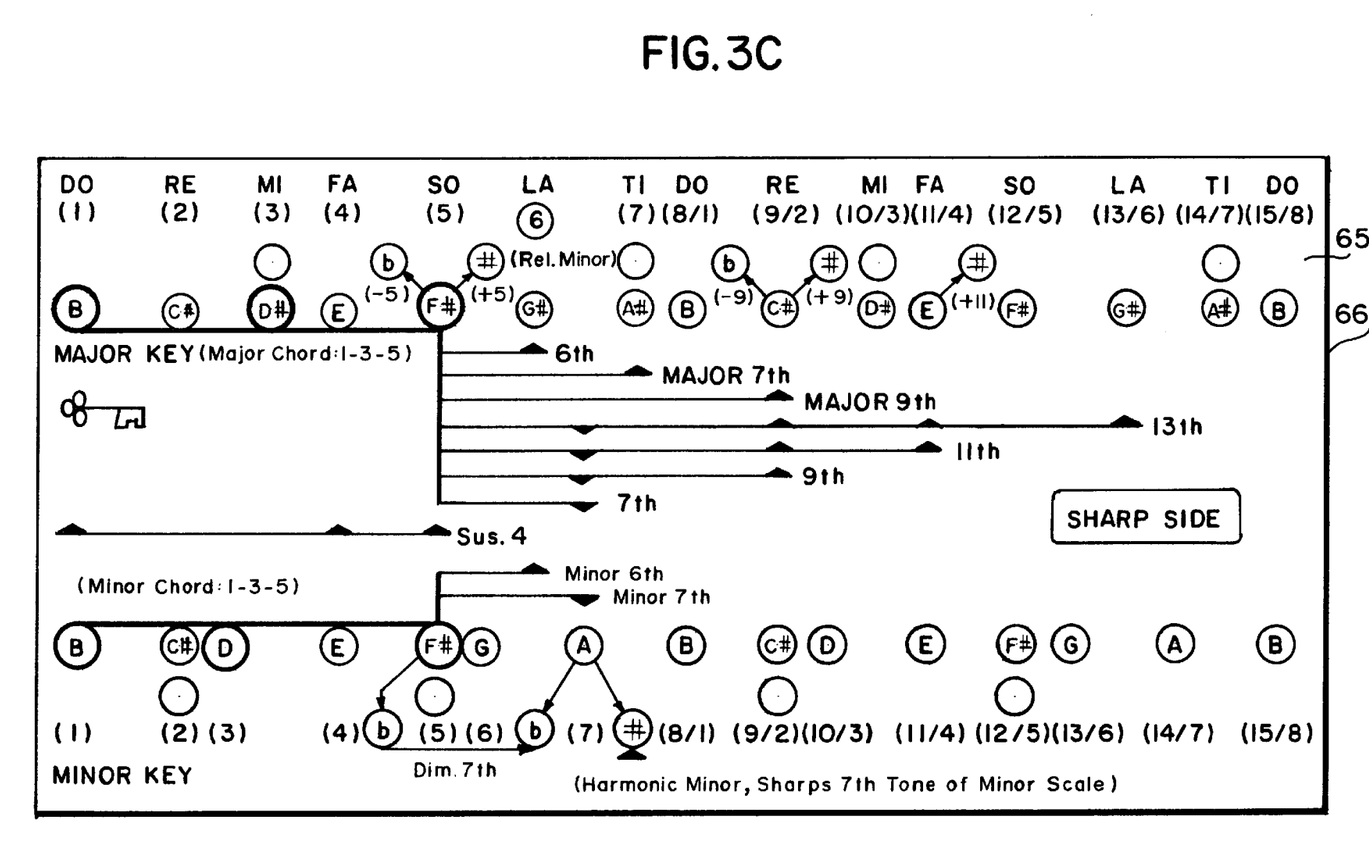
FIG. 3C shows the sharp (♯) side of the slide rule with a specific display

FIG. 3C the chord B, D♯, and F♯ (shown on the guide as corresponding to (1), (2), and (3), in row 66 respectively) also displays the double sharp {+5} in row 65. Another significant aspect is that the notes are displayed in the base 10 in the same contrasting colors as on a piano or similar keyboard.

While the invention has been described with reference to a preferred embodiment, the foregoing description should not be considered limiting in any way, for alterations and variations may occur to one of ordinary skill in the art, without departing from the spirit and scope of the instant invention. Consequently, the appended claims should not be limited to their literal terms, but should be construed in a liberal fashion consistent with the invention.

What is claimed is:

1. A musical scale slide rule, comprising:

a base, said base having a first and second side, an upper and lower set of musical note symbols on said base first side, each set having an upper row and lower row of musical note symbols, a cover, said cover having a front and back panel joined to one another at a top and bottom edge, said cover having an upper and lower set of apertures on said front panel, each set of apertures having an upper and lower row of apertures, said base positioned between said front and back panels of said cover, said cover slidable along said base, whereby aligning the left-most aperture of said upper row apertures with a musical note symbol on said base displays musical note symbols in said upper and lower set of aperture for the major key and minor key for the musical note in said left-most aperture, an upper and lower set of musical note symbols on said base second side, each set having an upper row and lower row of musical note symbols, an upper and lower set of apertures on said cover back panel, each set having an upper and lower row of apertures, wherein said cover front panel denotes sharp notes and said cover back panel denotes flat notes.

2. The musical scale slide rule of claim 1, further comprising indicia around the first, third and fifth apertures of said bottom row of said upper set to designate the major chord for the displayed scale.

3. The musical scale slide rule of claim 2, wherein the indicia is color around said first, third and fifth apertures.

4. The musical scale slide rule of claim 2, further comprising indicia around the first, third and fifth aperture of said upper row of the bottom set of apertures to designate the minor chord for the displayed scale.

5. The musical scale slide rule of claim 4, wherein the indicia is color.

6. A musical scale slide rule, comprising:

a base, said base having a first and second side, an upper and lower set of musical note symbols on said base first side, each set having an upper row and lower row of musical note symbols, a cover, said cover having a front and back panel joined to one another at a top and bottom edge, said cover having an upper and lower set of apertures on said front panel, each set of apertures having an upper and lower row of apertures, said base positioned between said front and back panels of said cover, said cover slidable along said base, whereby aligning the left-most aperture of said upper row apertures with a musical note symbol on said base displays musical note symbols in said upper and lower set of aperture for the major key and minor key for the musical note in said left-most aperture, indicia around the first, third and fifth apertures of said bottom row of said upper set to designate the major chord for the displayed scale, further comprising indicia to build more complex chords.

7. The musical scale slide rule of claim 6, wherein the indicia is arrows.

8. The musical scale slide rule of claim 1, further comprising indicia between said upper and lower sets of musical note symbols.

9. A musical scale slide rule, comprising:

a base, said base having a first and second side, an upper and lower set of musical note symbols on said base first side, each set having an upper row and lower row of musical note symbols, a cover, said cover having a front and back panel joined to one another at a top and bottom edge, said cover having an upper and lower set of apertures on said front panel, each set of apertures having an upper and lower row of apertures, said base positioned between said front and back panels of said cover, said cover slidable along said base, whereby aligning the left-most aperture of said upper row apertures with a musical note symbol on said base displays musical note symbols in said upper and lower set of aperture for the major key and minor key for the musical note in said left-most aperture, indicia between said upper and lower sets of musical note symbols, wherein said indicia is questions and answers.

10. The musical scale slide rule of claim 1, wherein said musical note symbols have a different designation for notes corresponding to the black keys of a keyboard.

11. The musical scale slide rule of claim 1, wherein sharp and flat scales are on opposite sides of the musical slide rule, whereby the user can find the correct scale by flipping the tool over.

12. The musical scale slide rule of claim 1, wherein the relationship of white sharp and white flats is displayed.

13. The musical scale slide rule of claim 1, wherein chords having both sharps and flats in the same chord are displayed.

14. The musical scale slide rule of claim 1, wherein chords having double sharps or double flats are displayed.

15. The musical scale slide rule of claim 1, wherein the relationship of the relative minor to a major key is displayed.

16. A musical scale slide rule, comprising:

a base, said base having a first and second side, an upper and lower set of musical note symbols on said base first side, each set having an upper row and lower row of musical note symbols, a cover, said cover having a front and back panel joined to one another at a top and bottom edge, said cover having an upper and lower set of apertures on said front panel, each set of apertures having an upper and lower row of apertures, said base positioned between said front and back panels of said cover, said cover slidable along said base, whereby aligning the left-most aperture of said upper row apertures with a musical note symbol on said base displays musical note symbols in said upper and lower set of aperture for the major key and minor key for the musical note in said left-most aperture, wherein said musical note symbols have a different designation for notes corresponding to the black keys of a keyboard, wherein sharp and flat scales are on opposite sides of the musical scale slide rule whereby the user can find the correct scale by flipping the musical scale slide rule over.

17. The musical scale slide of claim 10 wherein said notes of a different designation are in contrasting colors.

18. The musical scale slide of claim 17 wherein said contrasting colors comprises a light font against a darker background.

19. The musical scale slide of claim 16 wherein said musical note symbols have a different designation for notes corresponding to the black keys comprises said notes are in a lighter color disposed against a darker color background.

* * * * *